United States Patent [19]

Mueller et al.

[11] Patent Number: 4,533,126
[45] Date of Patent: Aug. 6, 1985

[54] THREE PIECE SNUBBER FOR AUTOMATIC WASHER

[75] Inventors: Dale E. Mueller, Benton Township, Berrien County; Joel M. Snider, Lincoln Township, Berrien County, both of Mich.

[73] Assignee: Whirlpool Corporation, Benton Harbor, Mich.

[21] Appl. No.: 446,782

[22] Filed: Dec. 3, 1982

[51] Int. Cl.³ .......................... D06F 23/00; B60T 7/12
[52] U.S. Cl. ...................................... 267/141; 68/23.3; 188/129; 188/381; 248/563; 248/636; 267/21 R
[58] Field of Search ............... 267/8 R, 57.1 R, 63 R, 267/21 R, 90, 134, 135, 141, 153; 188/129, 379, 381, 380; 248/636, 563, 564; 68/23.3, 23.1; 210/144, 364; 384/300; 403/170, 220, 245, 291, 298, 366; 8/159

[56] References Cited

U.S. PATENT DOCUMENTS

| | | | |
|---|---|---|---|
| 2,037,033 | 4/1936 | Lord | 267/63 R |
| 2,296,261 | 9/1942 | Breckenridge et al. | 68/23.1 |
| 2,813,712 | 11/1957 | Stanis | 267/63 R |
| 2,957,331 | 10/1960 | Bruckman | 68/23.3 |
| 3,146,979 | 9/1964 | Keetch | 248/563 |
| 3,445,080 | 5/1969 | Flannelly | 248/564 |
| 3,476,253 | 11/1969 | Fosler et al. | 68/23.3 |
| 3,738,633 | 6/1973 | Pineau | 267/141 |
| 3,876,172 | 4/1975 | Gosselin | 248/636 |
| 4,328,600 | 5/1982 | Bochan | 68/17 A |

Primary Examiner—George E. A. Halvosa
Assistant Examiner—Robert J. Oberleitner
Attorney, Agent, or Firm—Hill, Van Santen, Steadman & Simpson

[57] ABSTRACT

A three piece snubber is provided with two frictional surfaces, a low frictional surface and a high frictional surface and said snubber is held between a frame of an automatic washer and a suspended mass such that small movements between the frame and the mass causes movement between the parts of the snubber at the low friction area and large movement between the frame and the mass results in movement of the snubber as a whole with the high friction area contacting a support pad and resulting in the desired snubbing action.

12 Claims, 5 Drawing Figures

THREE PIECE SNUBBER FOR AUTOMATIC WASHER

BACKGROUND OF THE INVENTION

1. Field of the Invention

This invention relates to a means for snubbing a suspended mass and in particular for a three piece snubber for use in an automatic washer suspension system.

2. Description of the Prior Art

U.S. Pat. No. 2,957,331 discloses a ball supporting the suspended mass in an automatic washer which allows movement of the mass with little or no resistance but which restricts movement once a predetermined excessive amount of excursion is reached. The ball supports the suspended mass and rides on a metal plate in a rubber grommet which can be easily deflected upon movement of the ball until such time as the grommet is against the wall of a metal cylinder.

U.S. Pat. No. 3,146,979 discloses a vibration and shock isolator having an upper portion and a lower portion movable horizontally to each other with minimal restriction for small movements due to ball bearings captured in raceways between the two portions. However, large horizontal movements are resisted by utilizing curved raceways which translate the horizontal displacement into vertical displacement.

U.S. Pat. No. 3,876,172 discloses a three piece snubber for an automatic washer, all three pieces being solidly connected together.

One piece snubbers have been utilized in washing machines to limit the motion of the suspended mass of the hung suspension during machine operation. A problem presented by a one piece friction snubber is that it tends to squeak during small movements of the tub relative to the washer cabinet. Also, it tends to squeak during small movements if there is water or soap splashed onto the plate against which the snubber abuts, or if there is a build up of laundry aid or hard water on the plate.

SUMMARY OF THE INVENTION

The present invention provides a three-piece snubber, comprising an upper snubber portion, a lower snubber portion and a snubber pad connected to the lower snubber portion. The upper portion of the snubber rests on the snubber pad and there is a low coefficient of friction between the upper snubber portion and the snubber pad.

The upper snubber portion has snap tabs which hold the three pieces together but allow relative motion betweeen the upper snubber portion and the lower snubber portion. Because of the low coefficient of friction between the upper snubber portion and the snubber pad there is no noise generated as the result of small movements of the suspended mass or tub of the machine. Larger movements of the tub cause the snap tabs on the upper snubber portion to move against the lower snubber portion and then the entire snubber moves as if it were one piece thereby providing the necessary snubbing action.

A secondary function of the upper portion of the snubber is to provide a shield such that washing machine contaminants do not get between the snubber pad and the bottom of the upper snubber portion. The contaminants would cause a change in frictional characteristics of the materials and could cause generation of noise.

DESCRIPTION OF THE PREFERRED EMBODIMENTS

Figure 1:
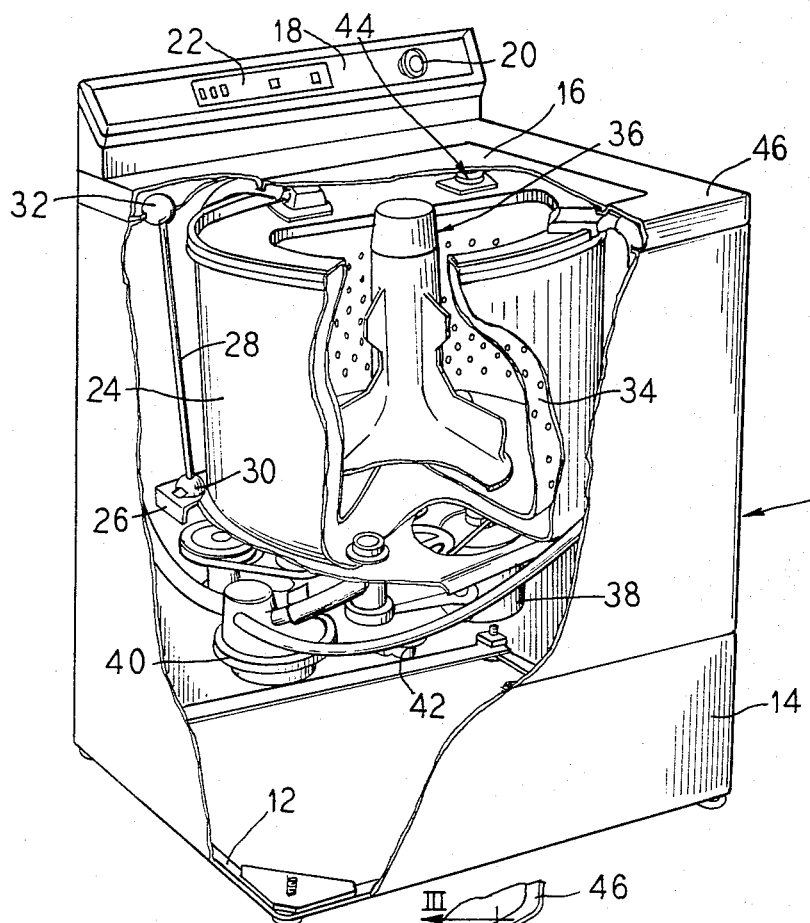
FIG. 1 is a perspective view of an automatic washer incorporating the snubber of the present invention.

In FIG. 1, reference numeral 10 indicates generally a washing machine of the automatic type including a frame 12 carrying vertical panels 14 forming the sides, front and back of the cabinet for the washing machine 10. A hinged lid 16 is provided in the usual manner to provide access to the interior of the washing machine. The washing machine 10 has a console 18 including a timer dial 20 and a program selector 22.

Internally of the machine 10 there is disclosed an imperforate fluid retaining tub 24 which is supported within the washing machine cabinet by means of a base support plate 26. A plurality of suspension rods 28 having resilient spherical end portions 30 and 32 are positioned about the tub 24 to suspend the base plate 26 and thus the tub 24 within the interior of the cabinet for the washing machine. Thus, the frame 12 and cabinet 14 comprise a fixed suspending mass and the tub 21 comprises a suspended mass.

A perforate washing receptacle or basket 34 is positioned concentrically within the tub 24. Centrally of the perforate washing basket 34 is a vertical agitator 36. An electric motor 38 drives a pump 40 as well as the other movable parts of the assembly by means of a transmission 42. A snubber is shown generally at 44 and is shown in greater detail in FIGS. 2, 3, 4 and 5.

Figure 2:
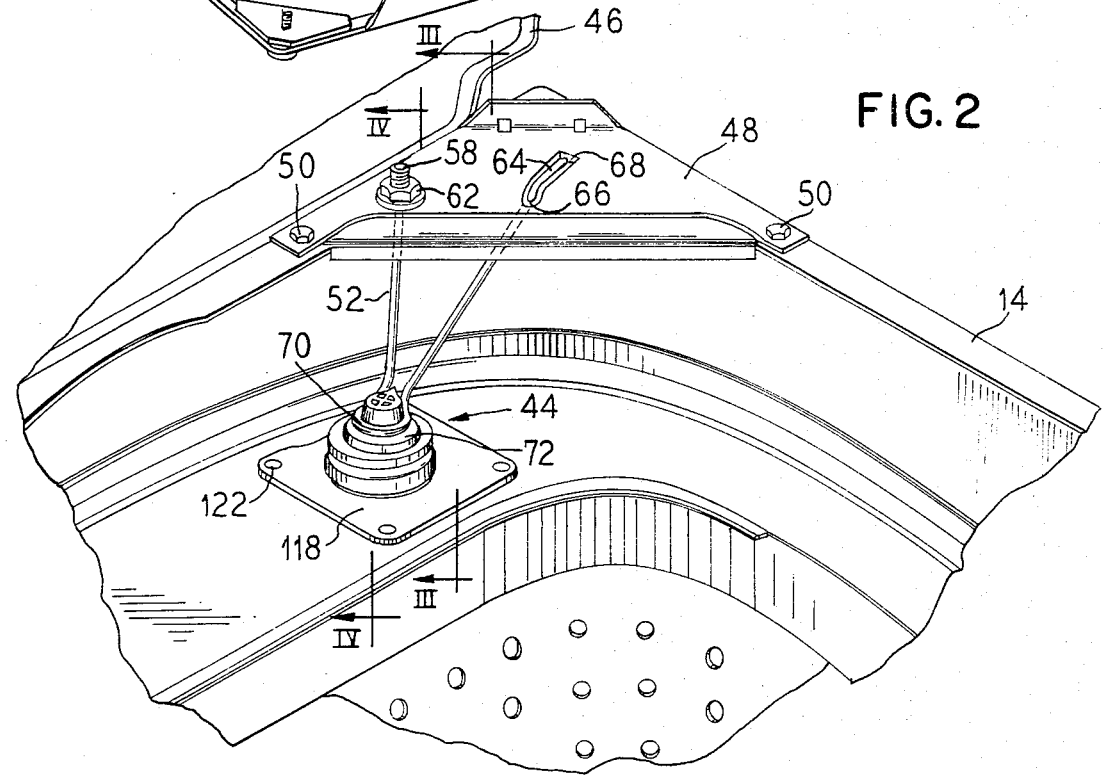
FIG. 2 is an enlarged partial view of the washer showing the placement of the snubber of the present invention.
Figure 3:
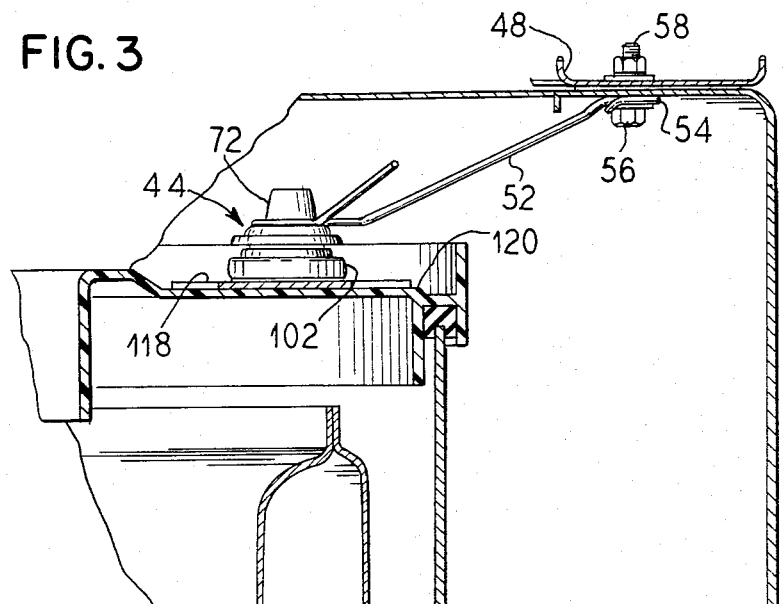
FIG. 3 is a cross sectional view of the snubber placement taken generally along the lines III—III of FIG. 2.

FIG. 2 shows the location of the snubber 44 as it is mounted in the cabinet of the washing machine. A top panel 46 of the washer is shown in a raised position which provides visual access to the snubber 44. A mounting bracket 48 is secured by appropriate means such as bolts 50 to the side and back panels 14 of the cabinet. A spring member 52 has a first end 54 (FIGS. 3 and 4) captured by a head 56 of a bolt 58. The bolt extends upwardly through an opening 60 in the mounting plate 48 and is secured in place by a nut 62.

Figure 4:
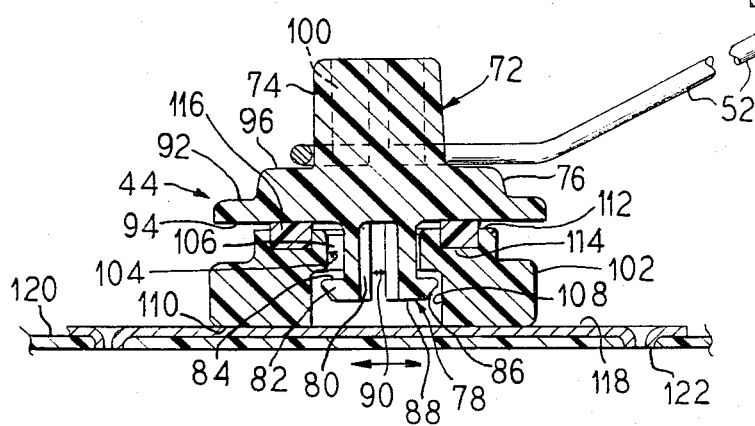
FIG. 4 is a cross sectional view of the snubber taken generally along the lines IV—IV of FIG. 2.

A second end 64 of the spring 52 is captured in the mounting plate 48 by means of the spring extending through an opening 66 in the bracket 48 and being captured in a detent 68. In this manner, the spring is held stationary relative to the bracket 48 and the washer cabinet. A bight 70 is formed in the spring midway of its length which is used to capture and retain an upper portion 72 of the snubber 44. As best seen in FIG. 4, the upper portion 72 comprises an upstanding cylindrical top section 74, which is captured in the bight 70 of the spring 52, a central flange section 76 and a bottom snap tab section 78.

The snap tab section 78 comprises a plurality of downwardly depending fingers 80 which have a radially outwardly extending flange 82 with a horizontal surface area 84 above the flange and an inwardly and downwardly sloped outer wall 86 thereby presenting a smaller bottom wall 88 below the flange than the upper wall 84. Adjacent fingers 80 are separated by a space 90 which allows for radial movement of the finger ends 80. The upper snubber portion 72 may be constructed of a material such as acetal or other equivalent material so that the fingers 80 are resilient and normally retain their original configuration.

The central flange area 76 of the upper portion 72 comprises a wide stepped flange 92 having a flat bottom surface 94 and a stepped upper surface 96 providing a resting surface for the bight 70 of the spring 52. The top section 74 of the upper snubber portion 72 is generally cylindrical, but has a radial extension 98 (FIG. 5) in one quadrant which can be formed as a tangential extension of the otherwise cylindrical wall and which operates as a key to lock the upper snubber portion in a fixed rotational position relative to the spring 52 to prevent movement and generation of noise between the spring 52 and the upper snubber 72.

Figure 5:
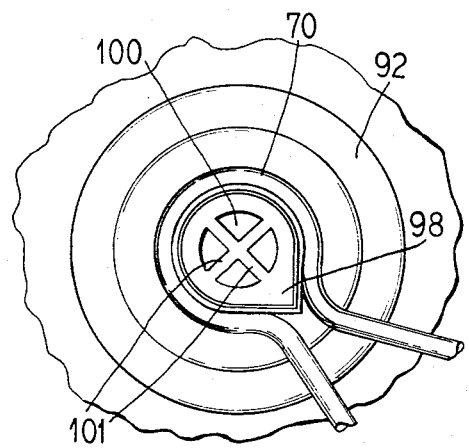
FIG. 5 is a top view of the snubber showing the mounting arrangement.

As seen in FIG. 5, the top section 74 of the upper snubber portion 72 is hollowed out as at 100 with supporting ribs 101 which retain the upper portion 74 in its normal shape. The hollow or relieved portion 100 is provided to assist in the molding and manufacturing of the upper snubber 72 and to reduce material costs.

Referring to FIG. 4, a lower snubber portion 102 is a generally cylindrical piece having a stepped cylindrical passage 104 therethrough such that an upper end 106 of the passage 104 is of a first diameter and a lower end 108 is of a larger diameter. The lower snubber portion 102 has a flat bottom wall 110 and a top wall 112 with an annular channel 114 and the wall 112.

A snubber pad or ring 116 is provided which is sized to be received in the annular channel 114 of the lower snubber portion and extends slightly above the top wall 112. The snubber ring 116 is constructed of virgin teflon or other equivalent material which presents a low friction surface. The lower snubber portion 102 may be constructed of talc filled polypropylene or other equivalent material which presents a high friction surface.

The snubber 44 thus consists of the three pieces, the upper snubber portion 72, the snubber ring 116 and the lower snubber portion 102 in assembly. The snubber ring 116 is inserted and retained in the channel 114 of the lower snubber portion 102 and the upper snubber portion 72 is assembled with the lower snubber portion 102 by inserting the fingers 80 of the snap tabs 78 into the upper end 106 of cylindrical passage 104 causing the fingers to be urged radially inwardly by camming action of the angled walls 86. As the flanged area 82 of the snap tab 78 moves into the enlarged lower end 108 of cylindrical passage 104, the fingers 80 resume their normal position such that the upper snubber 72 is captured by the lower snubber 102 in an axial direction.

The upper end 106 of cylindrical passage 104 is of a diameter sufficiently large to allow the upper snubber portion 72 to move radially or laterally with respect to the lower snubber to some limited degree. The bottom surface 94 of the upper snubber portion 72 rests on the snubber ring 116.

With the snubber assembly 44 captured by the bight 70 of the spring 52, the bottom wall 110 of the lower snubber portion 102 rests on a plate 118 which is secured to a tub ring 120 by appropriate fastening means such as friction snaps shown at 122. The plate may be manufactured of steel with a porcelain coating.

During operation of the washing machine, the basket 34, agitator 26 and other portions of the machine mechanism move relative to the cabinet of the washer. The suspension mounting absorbs some of the movement of these parts. However it has been found that a snubber is useful in further reducing movement between the cabinet and the tub. Past snubbers have occasionally resulted in a squeaking noise when there were small movements between the snubber and the plate, especially if wash liquid or other contaminants were introduced between the snubber and the plate. The present invention overcomes these problems in the following manner.

During relatively small movements of the tub with respect to the cabinet, a condition which caused the squeaks with the prior snubbers, the present snubber, because of its three part construction, allows for such movement without producing noise. The upper snubber portion is free to make small movements with respect to the lower snubber by riding on the snubber ring 116. The relatively low friction between the snubber ring 116 and the bottom wall 94 of the upper snubber 72 prevents generation of any noise.

As movement between the tub and the cabinet increases, the fingers 80 of the upper snubber 72 are urged into contact with the lower snubber 102 thereby causing the snubber assembly 44 to move as a unit. The force of the spring 52 downwardly on the snubber assembly 44 provides enough friction between the bottom wall 110 of the lower snubber 102 and the plate 118 so as to provide a sufficient snubbing action.

FIG. 4 shows the upper snubber portion 72 displaced to the right such that the fingers 80 are about to contact the walls of cylindrical passage 106. As the fingers contact the lower snubber portion, the assembly moves as a unit in the normal fashion of one piece snubbers to reduce the movement between the tub and the frame.

The flange 92 of the upper snubber portion 72 provides an additional feature of shielding the snubber ring 116 so that washing machine contaminents such as soap or water do not get between the snubber ring and the bottom surface 94 of the upper snubber portion. The contaminents would cause a change in frictional characteristics of the materials and could cause generation of noise.

Thus, there is provided a three piece snubber 44 wherein an upper snubber portion 72 snaps into a lower snubber portion 102 such that the snubber pad 116 attached to the lower snubber portion 102 allows low friction movement of the upper snubber portion 72 when there is limited excursion, but the construction causes the snubber portions to move as one snubber having a large coefficient of friction when the excursions are large.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. In an automatic washer having a suspension system including a suspended mass susceptible to excursion, a dual friction snubber system comprising:

a snubber having first and second parallel uniplanar friction surfaces, said first surface providing high friction and said second surface providing low friction;

a support on said suspended mass against which said snubber first surface acts;

a spring means for holding said snubber against said support; and means for permitting limited sliding uniplanar movement at said second surface for small movements of said mass and means for providing uniplanar movement at said first surface between said snubber and said support for large movements of said mass.

2. A dual friction snubber system for use with an automatic washer having a suspended mass depending from and movable relative to a suspending frame comprising:

a snubber having a first snubber portion, a second snubber portion with a uniplanar high friction engagement area, said first snubber portion and said second snubber portion engaging in a uniplanar low friction engagement area parallel with said high friction engagement area;

a support for contacting said high friction engagement area;

means between said frame and said mass to hold said snubber against said support; and means associated with said snubber for providing sliding uniplanar movement at said low friction engagement area whenever there are small movements between said frame and said mass and uniplanar movement between said high friction engagement area and said support whenever there are large movements between said frame and said mass.

3. The device of claim 2 wherein said support is on said suspended mass.

4. The device of claim 2 wherein said means between said frame and said mass comprises spring means.

5. A snubber for use with a fixed suspending mass and a suspended mass movable relative to the suspending mass comprising:

a snubber having first and second parallel uniplanar friction surfaces;

said first friction surface having a high coefficient of friction and said second friction surface having a low coefficient of friction;

a support area on one of said masses and means secured to the other of said masses to hold said first friction surface of snubber against said support area; and means for permitting limited sliding uniplanar movement at said second friction surface between said suspended mass and said suspending mass for small movements of said suspended mass and means for providing uniplanar movement between said first surface and said support area for large movements of said suspended mass.

6. The device of claim 5 wherein said snubber is constructed of three parts being an upper snubber portion, a lower snubber portion, and a snubber ring.

7. The device of claim 6 wherein the snubber ring presents said low friction surface to the upper snubber portion and the lower snubber portion presents said high friction surface to said support pad.

8. The device of claim 5 wherein said snubber has two portions movable relative to each other in a lateral direction to a limited degree.

9. The device of claim 8 wherein said low friction surface is interposed between said two portions.

10. A three piece snubber comprising:

an upper snubber portion having a cylindrical top section, a flanged middle section and a snap tap bottom section;

a lower snubber portion having a cylindrical passage therethrough and a high friction bottom surface, said passage having a narrow upper end and a wider lower end;

a snubber pad mounted on a top surface of said lower snubber portion to engage a bottom surface of said upper portion flanged section, said snubber pad providing a low friction surface; and said snap tab section insertable into said cylindrical passage to be captured therein in an axial direction, but free to move in a limited manner in a lateral direction, whereby, small lateral movement of said upper snubber portion results in relative movement between said upper portion and said pad and large lateral movement of said supper portion results in unitary movement of all portions of said snubber.

11. The device of claim 10 wherein said snubber pad is secured to said lower snubber portion.

12. A three piece snubber comprising:

a first snubber portion;

a second snubber portion having a high friction planar surface;

a pad sandwiched between said first portion and second portion opposite said second portion planar surface, said pad having a low friction planar surface parallel to said second snubber portion planar surface to provide a planar sliding area between said portions; and means for connecting said first and second portions perpendicular to said planar surfaces, said means permitting limited planar movement between said two portions;

whereby, small planar movement of said first snubber portion results in planar movement between said first portion and said second portion and large planar movement of said first portion results in uniplanar movement of both portions of said snubber.

* * * * *